No. 834,415. PATENTED OCT. 30, 1906.
R. J. SCOTT.
ANIMAL TRAP.
APPLICATION FILED SEPT. 21, 1905.
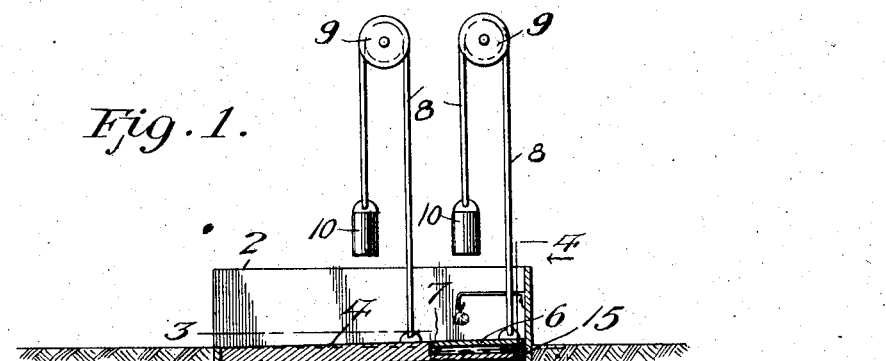
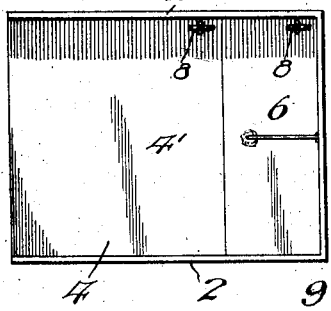
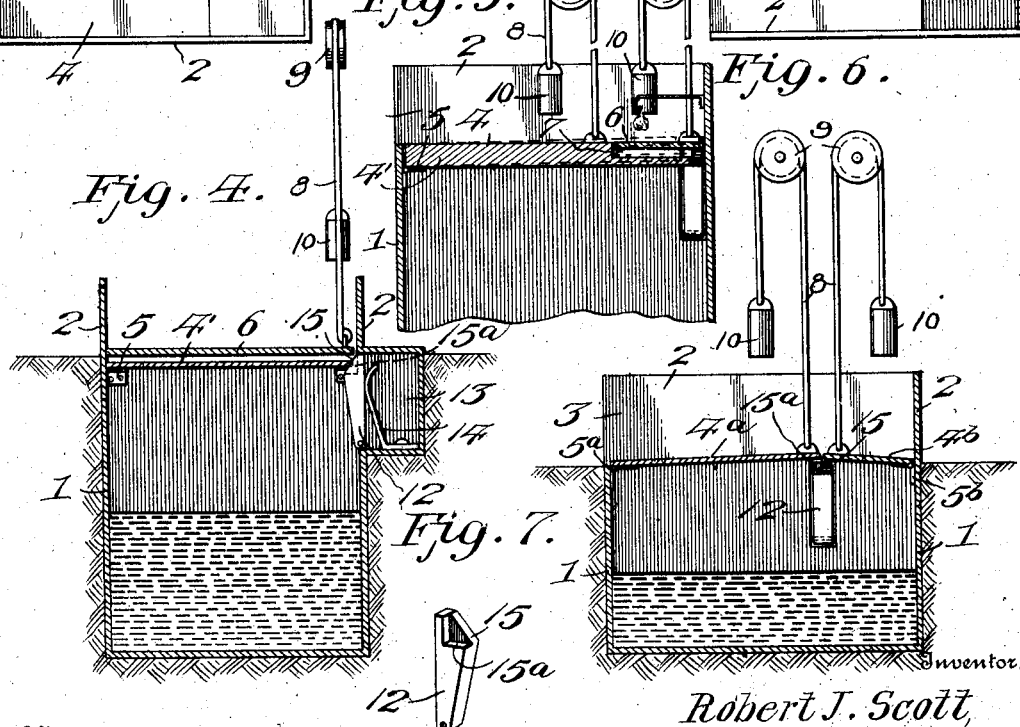
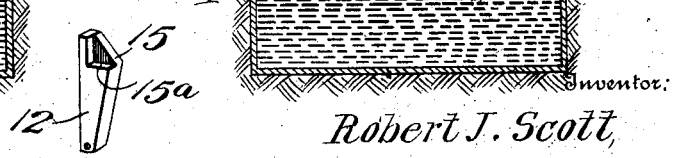
Witnesses
Frank B. Hoffman
C. C. Hines
Inventor:
Robert J. Scott,
By Victor J. Evans
Attorney

UNITED STATES PATENT OFFICE.

ROBERT J. SCOTT, OF ABBOTTSFORD, BRITISH COLUMBIA, CANADA.

ANIMAL-TRAP.

No. 834,415.

Specification of Letters Patent.

Patented Oct. 30, 1906.

Application filed September 21, 1905. Serial No. 279,441.

*To all whom it may concern:*

Be it known that I, ROBERT J. SCOTT, a subject of the King of Great Britain, residing at Abbottsford, in the Province of British Columbia and Dominion of Canada, have invented new and useful Improvements in Animal-Traps, of which the following is a specification.

This invention relates to certain new and useful improvements in animal-traps, and particularly to traps of that class in which a tilting platform or trap-door is arranged to open under the weight of the animal to precipitate it into an underlying receptacle.

One object of the invention is to provide a trap of this character which is simple and inexpensive in construction, efficient in use, and adapted to effectually obviate accidental or premature release of the platform or trap-door.

Another object is to provide a trap in which provision is made for counterbalancing the weight of the door and restoring the same to normal position, in connection with means auxiliary thereto for opposing a limited resistance to the opening of the door, whereby the casual opening of the door under the weight of foreign particles dropping or blown thereon or premature opening of the door when an animal steps thereon will be effectually avoided.

In the drawings hereto annexed and forming a part of this specification, Figure 1 is a vertical longitudinal section of a trap embodying my invention, showing in full lines the normal position of the parts of the door and in dotted lines the position assumed thereby when depressed to contact with the coöperating portions of the detent. Fig. 2 is a top plan view of the trap. Fig. 3 is a sectional plan view thereof on line 3 3 of Fig. 1. Fig. 4 is a vertical transverse section on the line 4 4 of Fig. 1. Fig. 5 is a view similar to Fig. 1, showing the door in depressed position. Fig. 6 is a sectional view similar to Fig. 1, showing a modified construction. Fig. 7 is a detail view of the detent.

Referring now more particularly to the drawings, the numeral 1 designates a receptacle which may be of any preferred construction and made of any suitable material and which may be embedded in the ground, as shown in the drawings, or supported above the surface thereof in any preferred manner. Where the receptacle is embedded, as illustrated in the present instance, the top of the body of said receptacle preferably lies flush with the surface of the ground, and said receptacle may be provided with an upwardly-projecting guard wall or flange 2, extending around three sides thereof, leaving one side open to form an entrance for the animal. The function of this guard-wall is to prevent any possibility of the animal descending with the door or platform from jumping upward therefrom and escaping, and it also serves to prevent to a large extent sticks, weeds, and other trash from being blown onto said door or platform. If desired, the guard-wall may extend along only two of the sides of the trap to form opposite entrances for the animal; but a single guard-flange may be employed and so located according to the arrangement of the trap as to serve as a barrier to limit as much as possible the accumulation of foreign matter on the trap-door from the action of the wind. When desired to catch vermin—such as rats, mice, rabbits, &c.—the receptacle may be partially filled with water, so that the animals will be drowned.

The door or platform 4 in the embodiment of the invention shown in Figs. 1 to 5, inclusive, normally closes the top of the receptacle and is hinged or pivoted to one of the walls thereof, as indicated at 5, the pivotal connection being below the entrance-way.

As shown, the door-body 4' is recessed or cut away at its free end for the reception of an independently movable or yielding section 6, pivoted thereto at 7 and spaced from the base of the cut-away portion to adapt said part 6 to have independent downward movement on its pivotal connection, and both the door-body and its yielding section are provided with a counterbalancing-weight connection comprising a cord, chain, or other flexible member 8, supported by a pulley 9 and carrying a weight 10, the conjoined weight of such connections being sufficient to counterbalance the weight of the door in entirety and to automatically restore it, after it has been tilted, to its normal position. Arranged at one side of the free end of the door and yielding section is a pivoted detent 12, mounted in a chamber or extension 13, formed on the receptacle and normally held projected by a spring 14. This detent is provided at its upper end with a beveled lip 15 and upon the forward side thereof adjacent to the base of said lip with a rest or shoulder 15ª, formed either by recessing the detent, as shown in Fig. 7, or providing said detent with a boss or projecting surface. The side edge of the recessed portion of the door 4' is notched or recessed at its corner adjacent the detent to accommodate the same and project therebeyond and also to form a bearing portion 17 to rest upon the shoulder 15ª when said door is depressed by the weight of an animal. The edges of the door-body and its yielding section 6 are normally held out of engagement with the shoulder 15ª and beveled lip 15 by the action of the counterweights. When an animal steps upon the door-body 4', however, the latter will be depressed under the weight thereof until the portion 17 engages and rests upon the shoulder 15ª, which will hold the door-body from downward movement until the animal steps upon the yielding section 6, which will descend under the weight thereof, thus bringing its engaging edge in contact with the beveled lip 15, whereby the detent 12 will be retracted or forced into the chamber 13 against the resistance of the spring 14, thus allowing the door as an entirety to drop and precipitate the animal into the receptacle 1, whereupon the counterweights will act to restore the door and its yielding section to normal position.

It will be understood that the detent constitutes a means for establishing a limited auxiliary resistance to the downward movement of the door or platform, which resistance is sufficient to prevent the door from dropping under the weight of sticks and other refuse dropping upon or blown by the action of the wind on the door even when the weight of such refuse is sufficient to overcome the resistance of the counterweights, thus preventing the casual opening of the door when the weight of the refuse is greater than that of the counterweights and premature opening of the door when the weight of the animal is greater than that of the counterweights. Normally, the counterweights hold the engaging portions of the door and its yielding section out of contact with the shoulder and beveled lip of the detent, so as to require a slight downward preliminary movement of the door before it engages the detent. The object of this arrangement is to permit the door to be depressed preliminarily when an animal steps thereon before engaging the detent in order to prevent premature retraction of the latter. This arrangement further permits the door to sag under the weight of refuse thereon until the resistance of the counteracting weights is entirely overcome before any pressure is thrown upon the detent, so that even when the weight of the refuse upon the door is sufficient to counterbalance the resistance of the weight the door may still operate in the usual manner. Figs. 1 and 6 show in full and dotted lines the normal and depressed positions of the door-body and its yielding section, while Fig. 4 shows the normal position in full lines, from which the operation will be readily understood.

In the embodiment of the invention shown in Fig. 6 the door or platform is composed of two independent sections 4ª and 4ᵇ, which are respectively pivoted at their outer ends to the outer end walls of the receptacle, as indicated at 5ª and 5ᵇ, and are counterbalanced and restored to normal position by counterweight means of the construction previously described, one of the counterweight devices being attached to each door-section. The means here employed for establishing a limited resistance to the downward movement of the door-sections is the same as that disclosed in Figs. 1 to 5, inclusive—namely, the detent 12—the adjacent side edges of the free ends of the sections 4ª and 4ᵇ being adapted to coöperate with the shoulder 15ª and beveled lip 15 and to be normally held slightly above and out of contact therewith by the counterweight devices. When an animal steps upon the section 4ª, the latter will descend and rest upon the shoulder 15ª, and thus be held from downward movement until the animal steps upon the section 4ᵇ, when said section 4ᵇ will be forced down and engage the lip 15 and retract the detent 12, thus permitting both sections to drop and precipitate the animal into the receptacle. If the animal is fully on the section 4ᵇ and attempts to jump backward onto the section 4ª in an effort to escape, the latter-named section will tilt beneath him and he will in either event be precipitated into the receptacle, thus precluding any possibility of his escape.

Of course it will be understood that in the event an entrance-way is provided at the end of the trap adjacent the section 6 or 4ᵇ (shown in Figs. 1 to 5, inclusive,) and an animal should pass upon the door through said entrance-way the door will also operate to precipitate him into the receptacle, the sections 6 and 4ᵇ operating in such event to effect a direct release, as will be readily understood.

It will be seen from the foregoing description of the construction and operation, taken in connection with the accompanying drawings, that a trap is provided which is simple, reliable, and efficient, and is automatically reset after operation for succeeding operations, also that by the use of the means auxiliary to the counterweight for instituting a resistance to the downward movement of the door an important advantage is attained, as unless the weight of foreign particles on the door is great enough to overcome the combined resistance of the counterweight and such resisting means the door will be held in closed position, so as to avoid exciting any suspicion in the animal or cause it to distrust the security of the support formed by the door.

Having thus described the invention, what is claimed as new is—

1. An animal-trap comprising a receptacle, a door embodying hinged or pivoted sections, means for counterbalancing the weight of said sections and restoring the same to normal position, and an automatically-projected detent, said detent being provided with a stop portion adapted to be engaged by one of the door-sections, and a retracting portion adapted to be engaged by the other door-section, whereby when the latter-named section is depressed the detent will be retracted.

2. An animal-trap comprising a receptacle, a door embodying two hinged or pivoted sections, means for counterbalancing the weight of said sections and restoring the same to normal position, and an automatically-projected detent, said detent being provided with a stop-shoulder adapted to be engaged by one of said sections, and a beveled retracting portion adapted to be engaged by the other section, whereby when the latter-named section is depressed the detent will be retracted.

3. A trap comprising a receptacle, a door embodying two hinged or pivoted sections, means for counterbalancing the weight of said sections and restoring the same to normal position, and a spring-projected detent provided with a stop-shoulder adapted to be engaged by one of said sections, and a retracting portion adapted to be engaged by the other section, whereby when the latter-named section is depressed the detent will be retracted.

4. A trap comprising a receptacle, a door composed of a main section pivoted to the receptacle and an operating-section pivoted to said main section, means for counterbalancing the weight of the door and restoring the same to normal position, and an automatically-projected detent having a stop-shoulder adapted to be engaged by the main section and a beveled retracted portion adapted to be engaged by the operating-section, whereby when the latter-named section is depressed the detent will be retracted to release the door.

In testimony whereof I affix my signature in presence of two witnesses.

ROBERT J. SCOTT.

Witnesses:
H. D. HOLMES,
P. G. SHALLCROSS.